(12) United States Patent
Jun et al.

(10) Patent No.: US 9,920,438 B2
(45) Date of Patent: Mar. 20, 2018

(54) METHODS AND APPARATUS FOR ULTRATHIN CATALYST LAYER FOR PHOTOELECTRODE

(75) Inventors: Kimin Jun, Hillsboro, OR (US); Joseph Jacobson, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1164 days.

(21) Appl. No.: 13/544,940

(22) Filed: Jul. 9, 2012

(65) Prior Publication Data

US 2013/0008495 A1    Jan. 10, 2013

Related U.S. Application Data

(60) Provisional application No. 61/505,197, filed on Jul. 7, 2011.

(51) Int. Cl.
| | | |
|---|---|---|
| C25B 1/00 | (2006.01) | |
| C25B 11/02 | (2006.01) | |
| C25B 11/06 | (2006.01) | |
| C25B 11/04 | (2006.01) | |
| H01G 9/20 | (2006.01) | |

(52) U.S. Cl.
CPC ............ C25B 1/003 (2013.01); C25B 11/02 (2013.01); C25B 11/0452 (2013.01); H01G 9/2031 (2013.01); H01G 9/2036 (2013.01); *Y02E 10/542* (2013.01); *Y02P 20/135* (2015.11)

(58) Field of Classification Search
None
See application file for complete search history.

(56) References Cited

U.S. PATENT DOCUMENTS

| | | | |
|---|---|---|---|
| 4,592,807 A | * | 6/1986 | Switzer ............... C25B 11/0452 204/DIG. 3 |
| 4,656,103 A | | 4/1987 | Reichman et al. |
| 7,122,873 B2 | | 10/2006 | Miller et al. |
| 2007/0196268 A1 | | 8/2007 | Smith et al. |

(Continued)

OTHER PUBLICATIONS

Wang et al, Characteristics of Photoelectrochemical Cells Based on n/n+-Si and p/n+-Si Photoanodes Modified by Metal Films, Zeitschrift fur Naturforschung A, vol. 45, No. 5, pp. 695-701, May 1990.*

(Continued)

*Primary Examiner* — Harry D Wilkins, III
(74) *Attorney, Agent, or Firm* — Stephen R. Otis (57) ABSTRACT

In exemplary implementations of this invention, a photoelectrode includes a semiconductor for photocarrier generation, and a catalyst layer for altering the reaction rate in an adjacent electrolyte. The catalyst layer covers part of the semiconductor. The thickness of the catalyst layer is less than 60% of its minority carrier diffusion distance. If the photoelectrode is a photoanode, it has an OEP that is more than the potential of the valance band edge but less than the potential of the Fermi level of the semiconductor. If it is a photocathode, it has an RHE potential that is less than the potential of the conduction band edge but more than the potential of the Fermi level of the semiconductor. The absolute value of difference (OEP minus potential of valence band edge, or RHE potential minus potential of conduction band edge) is greater than zero and less than or equal to 0.2V.

3 Claims, 6 Drawing Sheets

(56) References Cited

U.S. PATENT DOCUMENTS

| | | |
|---|---|---|
| 2007/0235711 A1 | 10/2007 | Xiang et al. |
| 2008/0286643 A1 | 11/2008 | Iwasaki |
| 2010/0133110 A1 | 6/2010 | Nocera et al. |
| 2010/0282601 A1 | 11/2010 | Nomura et al. |
| 2011/0005590 A1 | 1/2011 | Walukiewicz et al. |
| 2012/0216854 A1* | 8/2012 | Chidsey et al. .............. 136/248 |

OTHER PUBLICATIONS

Chen et al, Atomic Layer-deposited tunnel oxide stabilizes silicon photoanodes for water oxidation, Nature Materials, Vo. 10, Jun. 2011, pp. 539-544.*

Maiolo et al, High Aspect Ratio Silicon Wire Array Photoelectrochemical Cells, Journal of the American Chemical Society, vol. 129, No. 41, Sep. 2007, pp. 12346-12347.*

Ono et al, Photoelectrochemical Properties of Iron-Oxide Films and the Coating Effects onto n-Si as an Efficient Photoanode, Japanese Journal of Applied Physics, vol. 21, No. 7, Jul. 1982, pp. 1075-1082.*

Li et al, Testing of Stability and Spectroscopic Response of NiO(OH)/Ni2Si/n+/n-Si-Photoanode, Zeitschrift für Naturforschung A. vol. 43, Issue 3, Mar. 1988, pp. 248-252.*

Jun, Iron-oxide catalyzed silicon photoanode for water splitting, Doctoral Thesis submitted to the Dept. of Mechanical Engineering at the Massachusetts Instittute of Technology, Sep. 2011 (submission date), obtained at http://lab.cba.mit.edu/docs/theses/11.09.Jun.pdf.*

Switzer, The n-Silicon/Thallium(III) Oxide Heterojunction Photoelectrochemical Solar Cell, Journal of the Electrochemical Society, vol. 133, No. 4, Apr. 1986, pp. 722-728.*

Hwang et al, Photoelectrochemical Properties of TiO2 Nanowire Arrays: A Study of the Dependence on Length and Atomic Layer Deposition Coating, ACS Nano, vol. 6, No. 6, May 2012, pp. 5060-5069.*

Linsebigler et al, Photocatalysis on TiO2 Surfaces: Principles, Mechanisms, and Selected Results, Chemical Reviews, vol. 95, No. 3, May 1995, pp. 735-758.*

Salvador, Hole diffusion length in n-TiO2 single crystals and sintered electrodes: Photoelectrochemical determination and copmarative analysis, Journal of Applied Physics, vol. 55, No. 8, Apr. 1984, pp. 2977-2985.*

Aarik et al, Characterization of titanium dioxide atomic layer growth from titanium ethoxide and water, Thin Solid Films, vol. 370, No. 1-2, Jul. 2000, pp. 163-172.*

U.S. Appl. No. 61/464,014 in support of Chidsey et al (US 2012/0216854).*

Kanan, M., Nocera, D.; In situ formation of an oxygen-evolving catalyst in neutral water containing phosphate and Co2+. Science 2008, 321 (5892), pp. 1072-1075.

Dinca, M.; Surendranath, Y.; Nocera, D.; Nickel-borate oxygen-evolving catalyst that functions under benign conditions. Proceedings of the National Academy of Sciences of the United States of America 2010, 107 (23), pp. 10337-10341.

Kay, A.; Cesar, I.; Gratzel, M.; New benchmark for water photooxidation by nanostructured alpha-Fe2O3 films. Journal of the American Chemical Society 2006, 128 (49), pp. 15714-15721.

Osaka, T.; Kitayama, H.; Hirota, N.; Eskildsen, S., Structural Analysis of Iron Oxide Coated n-Silicon Heterojunction Photoanodes. Electrochimica Acta 1984, 29 (10), pp. 1365-1370.

International Search Report and Written Opinion, dated Sep. 18, 2012, PCT/US12/45988, international filing date Jul. 9, 2012, Methods and Apparatus for Ultrathin Catalyst Layer for Photoelectrode, Kimin Jun et al.

* cited by examiner

METHODS AND APPARATUS FOR ULTRATHIN CATALYST LAYER FOR PHOTOELECTRODE

RELATED APPLICATIONS

This application claims the benefit of U.S. Provisional Application Ser. No. 61/505,197, filed Jul. 7, 2011, the entire disclosure of which is herein incorporated by reference.

FIELD OF THE TECHNOLOGY

The present invention relates generally to photoelectrochemical cells.

BACKGROUND

Silicon, with its good balance between low cost and narrow band gap matched to the visible solar spectrum, is widely used for photovoltaic applications. However, conventionally, silicon has been a poor choice for use in a water-splitting anode, due to silicon's lack of catalytic functionality at the silicon-water interface and its high valence band edge position relative to the anode's oxygen evolution potential ("OEP").

SUMMARY

In exemplary implementations of this invention, high photocurrents are generated by photoanodes comprised of very thin iron-oxide films atop a silicon layer at high pH environment. Silicon plays the role of a primary light absorption layer while the iron-oxide serves as a catalyst. A sufficiently thin catalytic film allows for the silicon band structure to be present at the semiconductor-water interface while still providing for a catalytic water splitting surface. This arrangement allows for the production of particularly high photocurrents at the photoanode.

A photoelectrode is a device which absorbs light, generates photocarriers and transports these carriers to ionic chemical species to induce chemical reactions. Therefore, high performance in photocarrier generation is desirable. However, in a photoelectrode, the generated photocarriers must be consumed by chemical redox reactions. Depending on the nature of redox couple, there could be a huge activation energy barrier. A representative example is water oxidation reaction. Unless the barrier is lowered, carrier transport cannot happen. For this reason, efficient catalysis capability is also desirable in photoelectrode operation. However, it is hard to find single material which satisfies both effective photocarrier generation and efficient catalysis criteria. Rather, if the two functions are completely separable, we can arbitrarily choose good materials for individual purposes—that is, light absorption layer and catalyst layer.

Simple stacking of two layers does not satisfactorily separate the two functions. Preferably, the energy band structure of semiconductor body (light absorption layer) is not distorted by the catalyst layer since band bending of semiconductor layer plays a key role of carrier transport to the surface.

Consider a stack comprising a semiconducting light absorption layer, catalyst and electrolyte. To achieve separation of the functions, at least two factors must be considered.

First is the catalyst material. If the catalyst is metallic, space charge region in light absorption layer is governed by semiconductor-metal junction, rather than semiconductor-electrolyte junction. Then, there are two active junctions, semiconductor-metal and metal-electrolyte, which are interdependent by metal choice. This increases the complexity and makes it hard to find the optimal metallic catalyst. To solve this problem, in exemplary implementations of this invention, the catalyst comprises a very thin semiconductor or semiconductor-like insulator. This enables single junction, light absorption layer-electrolyte, since the effect of catalyst can be made negligibly small in junction formation.

Second is the catalyst thickness. If the catalyst layer is thick, carriers from light absorption layer cannot be effectively transported to the electrolyte interface due to insulating barrier or recombination junction. Then, unless the catalyst is simultaneously a good photovoltaic semiconductor, the overall current is stagnated by the poor photovoltaic performance. To solve this problem, in exemplary implementations of this invention, the catalyst layer is so thin that the catalyst's contribution to the energy band structure at the junction is minimal.

In exemplary implementations of this invention, a very thin semiconducting catalyst is deposited on a light absorber, allowing the two functions to be separated. With this approach, a very affordable materials pair may be used, instead of expensive and exotic materials.

The above description of the present invention is just a summary. It is intended only to give a general introduction to some illustrative implementations of this invention. It does not describe all of the details of this invention. This invention may be implemented in many other ways.

The above Figures illustrate some illustrative implementations of this invention, or provide information that relates to those implementations. However, this invention may be implemented in many other ways. The above Figures do not show all of the details of this invention.

The thickness of some of the layers depicted in the above Figures is exaggerated for clarity of presentation.

DETAILED DESCRIPTION

In exemplary implementations of this invention, a photoelectrode includes both (1) a light absorbing semiconductor for photocarrier generation and (2) a catalyst layer for altering the rate of an electrochemical reaction in an electrolyte adjacent to the catalyst layer. The light-absorbing semiconductor and the catalyst are comprised (at least primarily) of different materials.

The catalyst layer covers a portion of the light absorbing semiconductor's surface. The catalyst layer is positioned between that portion of the light absorber and the electrolyte.

The catalyst layer is "ultrathin". For example, the catalyst layer may be so thin that the energy band structure of the light-absorbing semiconductor (rather than the energy band structure of the catalyst layer) predominates at the electrode/electrolyte junction. Or, for example, the thickness of the catalyst layer may be less than 60% of the minority carrier diffusion distance of the catalyst layer. Or, for example, the catalyst layer may be so thin that the flat band potential of the photoelectrode with the catalyst film present differs by less than 20% from the flat band potential of photoelectrode with the catalyst film is removed.

The photoelectrode may be either a photoanode or a photocathode. If the photoelectrode is a photoanode, then the photoanode may be adapted to have an oxygen evolution potential ("OEP") that is more than the potential of the valance band edge of the semiconductor and less than the potential of the Fermi level of the semiconductor, the absolute difference between the OEP and the potential of the valance band edge being greater than zero and less than or equal to 0.2V. If the photoelectrode is a photocathode, then the photocathode may be adapted to have an reverse hydrogen evolution ("RHE") potential that is less than the potential of the conduction band edge of the semiconductor and more than the potential of the Fermi level of the semiconductor, the absolute value of the difference between the RHE potential and the potential of the conduction band edge being greater than zero and less than or equal to 0.2V.

If the photoelectrode is a photoanode, then the interior of the photoanode may be doped with an n-type dopant, and an exterior region of the light-absorbing semiconductor (that is not covered by the catalyst layer) may be n+ doped. For example, the interior of the light absorbing semiconductor may be an n-type material doped with phosphorus, the front side of that semiconductor may be covered by the catalyst layer, and the back side of that semiconductor may be n+ doped with phosphorous.

If the photoelectrode is a photocathode, then the interior of the photocathode may be doped with a p-type dopant, and an exterior region of the light-absorbing semiconductor (that is not covered by the catalyst layer) may be p+ doped. For example, the interior of the light absorbing semiconductor may be a p-type material doped with boron, the front side of that semiconductor may be covered by the catalyst layer, and the back side of that semiconductor may be p+ doped with boron.

At least a portion of the photoelectrode may comprise an array of nanowires or nanotubes. The nanowires or nanotubes may be of any shape, including bent or branching. The nanowires or nanotubes may comprise the light-absorbing semiconductor covered at least in part by the catalyst layer.

In a prototype of this invention: (a) the photoelectrode is a photoanode, (b) the light-absorbing semiconductor primarily comprises n-type silicon doped with phosphorus, (c) the catalyst layer primarily comprises iron oxide, (d) the thickness of the catalyst layer is equal to or less than 10 nm, (e) the electrolyte comprises an electrolytic solution with a pH higher than or equal to 10, (f) the catalyst layer is on a side of the light-absorbing semiconductor, and (g) a shallow layer of n+-doped silicon doped with phosphorous is on an other side of the light-absorbing semiconductor.

Figure 1:
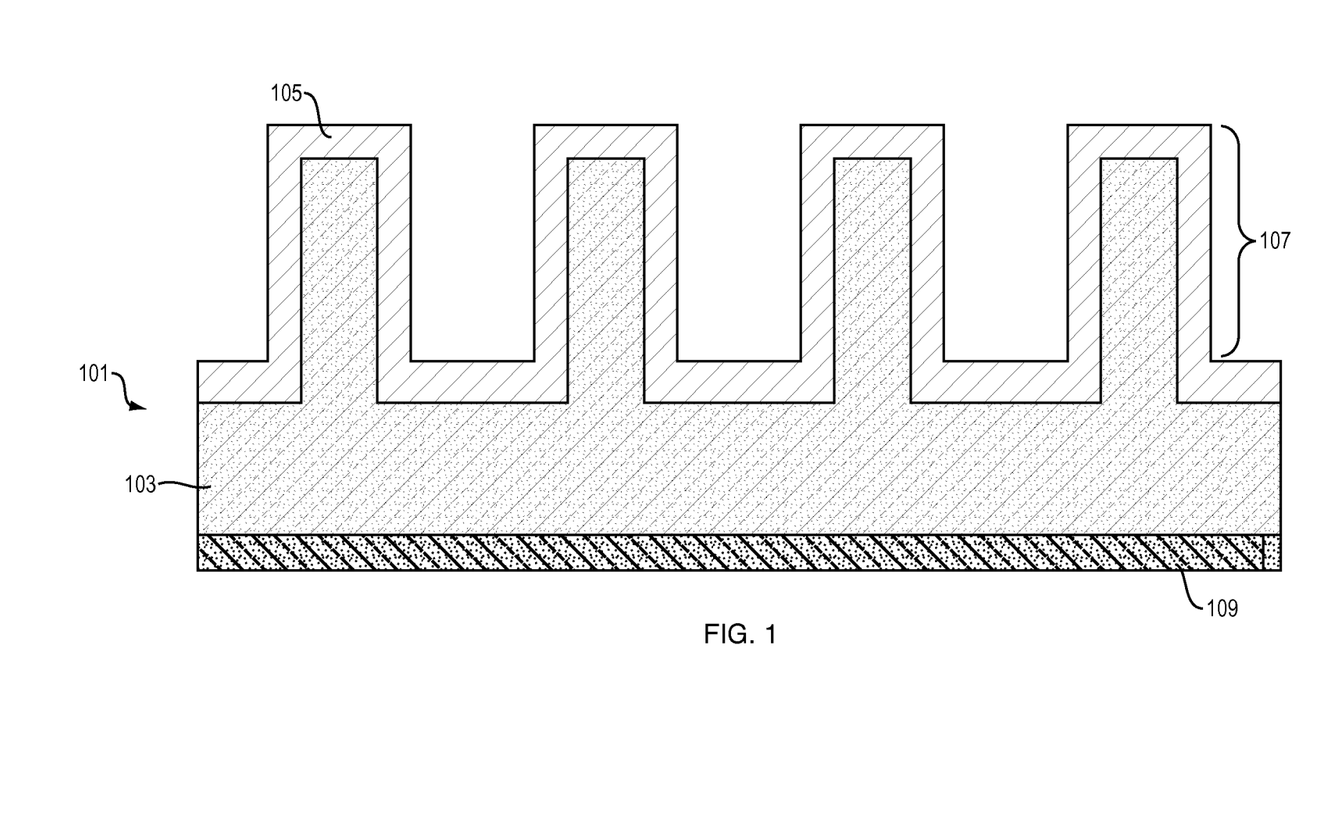
FIG. 1 is a diagram that shows a cross-sectional view of a photoelectrode, including a nanowire array.

FIG. 1 is a diagram that shows an exemplary embodiment of this invention. A photoelectrode 101 includes both (a) a light absorbing semiconductor 103 for photocarrier generation and (b) a catalyst layer 105 for altering the rate of an electrochemical reaction in an electrolyte adjacent to the catalyst layer. The thickness of some of the layers in FIG. 1 is exaggerated for clarity of presentation.

The light-absorbing semiconductor 103 may primarily comprise silicon, or another material. For example, the light-absorber 103 may primarily comprise amorphous silicon or cuprous oxide. Or, for example, the light-absorbing semiconductor 103 may primarily comprise a material with a valance band edge equal to 1.23-1.25 V vs. RHE.

The catalyst layer 105 may itself be semiconducting or nearly insulating. For example, the catalyst 105 may comprise iron oxide, nickel oxide, nickel borate, cobalt oxide, iridium oxide, or another compound that includes cobalt, nickel or iridium. Preferably, the catalyst 105 has a low doping density. During normal operation of the photoelectrode 101, the catalyst layer 105 is positioned between the light-absorbing semiconductor 103 and an electrolyte.

In the example shown in FIG. 1, the photoelectrode includes an array of nanostructures, such as nanostructure 107. For example, the nanostructures may comprise nanowires or nanotubes. Preferably, the nanostructures (e.g., 107) are covered at least in part by the catalyst layer 105.

In the example shown in FIG. 1, the interior of the light-absorbing semiconductor is lightly doped (with an n-type material such as phosphorous if the photoelectrode is a photoanode, or with a p-type material such as boron if the photoelectrode is a photocathode). An exterior region 109 of the light-absorbing semiconductor (that is not covered by catalyst layer 105) is heavily doped (n+ doping or p+-doping if the photoelectrode is a photoanode or photocathode, respectively). For example, this exterior, heavily doped region 109 may comprise the "back side" of the photolectrode, if the catalyst layer is on the "front side" of the photoelectrode.

In a prototype of this invention, a photoanode was fabricated as follows: Silicon electrodes were made of 4" n-type phosphorous-doped silicon wafers (resistivity 5~25 Ω-cm, thickness 500~550 μm, (100) orientation) This wafer was diced into 1×1 cm$^2$ pieces that were cleaned in organic solvents and 1:10 hydrofluoric acid (HF, 49% wt.): deionized water solution before chemical vapor deposition (CVD). The CVD setup comprises two bubblers and three mass flow controllers (MFC, 1479A, MKS Instruments®). At each bubbler, 10 ml of iron pentacarbonyl (Fe(CO)$_5$, Sigma-Aldrich®) and 10 ml of titanium isopropoxide (Ti[OCH(CH$_3$)$_2$]$_4$, Sigma-Aldrich©) were contained. Iron pentacarbonyl was chilled in a cold water bath at 5° C., and the titanium isopropoxide was maintained at room temperature (20° C.). 10 standard cubic centimeters per minute (sccm) argon and 250 sccm oxygen were fed into iron and titanium precursors respectively. These two precursors and extra oxygen (350 sccm) were mixed and fed into a glass funnel (an enlarging adapter, 14/20 to 24/40). The silicon substrate was placed on a heated surface (~173° C.), and the glass funnel was placed with 1 mm clearance from the bottom. Film thickness was controlled by deposition time.

In this prototype, the substrate backside was cleaned for a short time (1 minute) by 1:10 HF:deioninzed water before metal deposition. Using a thermal evaporator, 7 nm aluminum and 50 nm silver were deposited in order. A silver wire with 0.5 mm diameter was attached to the metal contact by silver paint (silver in MIBK, Ted Pella, Inc.) and dried for 30 minutes. Afterward, the silver wire was insulated using Teflon® tubing, and the backside was encapsulated with epoxy on slide glass. The epoxy was cured for more than 2 hours at 70° C. To remove organic contaminants, the device was cleaned by ozone (Aqua-6 ozone generator, A2Z Ozone, Inc.) for 10 minutes.

Figure 2:
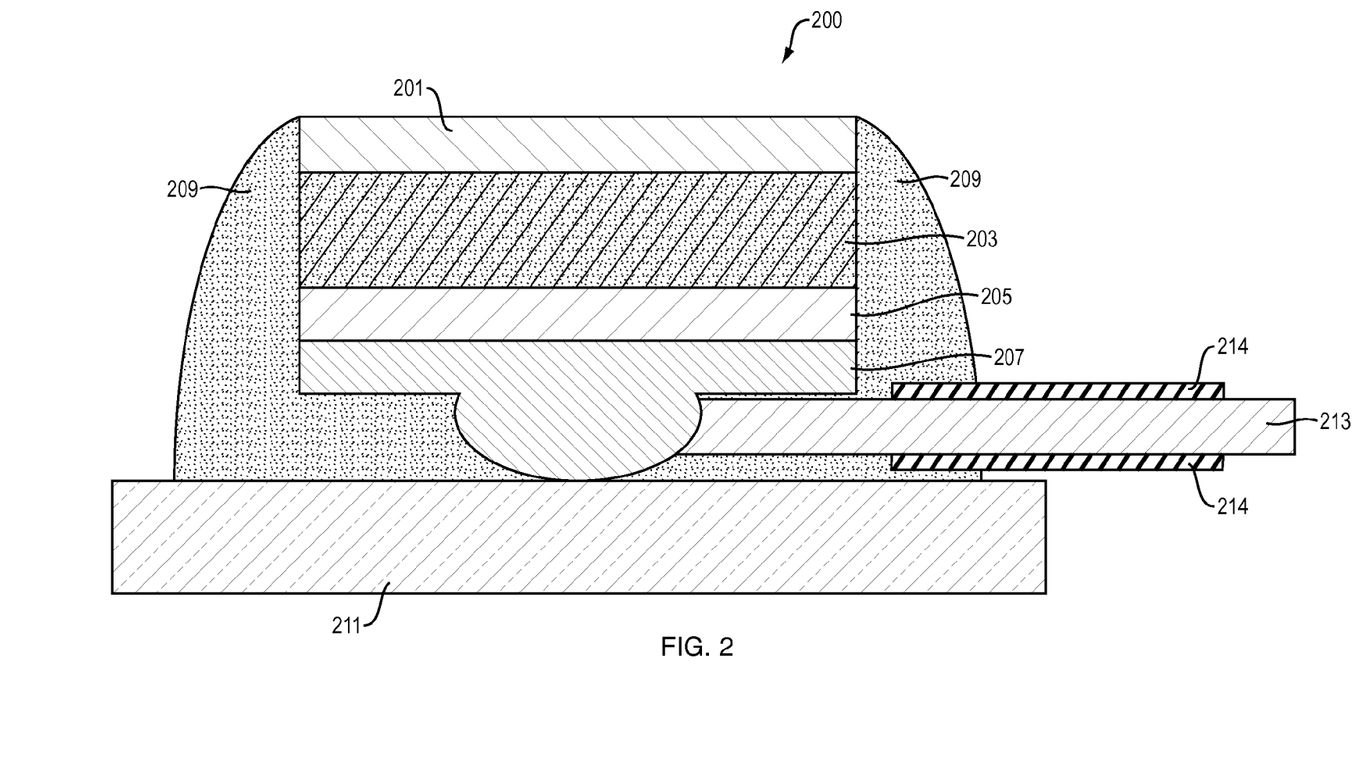
FIG. 2 is a diagram that shows a cross-sectional view of a photoelectrode that is partially encapsulated in epoxy.

FIG. 2 is a diagram that shows a cross-sectional view of a photoelectrode 200 that is partially encapsulated in epoxy. The photoelectrode 200 comprises layers of iron oxide 201, silicon 203, aluminum 205, and silver 207. The silver 207 is attached to a silver wire 213 that is insulated with polytetrafluoroethylene (PTFE) 214. Epoxy 209 encapsulates the back and side of the photoelectrode in order to electrically insulate the photoelectrode from the electrolyte. The epoxy 209 does not, however, cover the top of the iron oxide layer 201, so the iron oxide catalyst 201 directly contacts the electrolyte. The epoxy is attached to a layer of glass 211.

Figure 3:
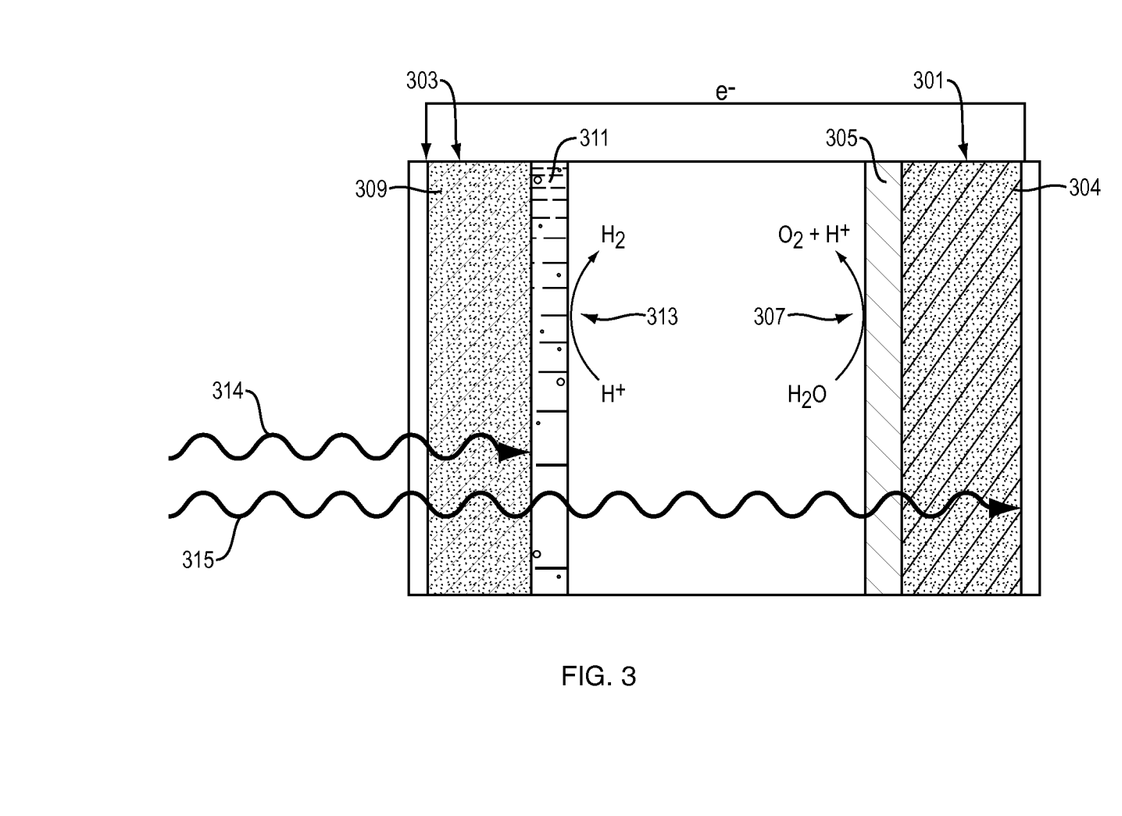
FIG. 3 is a diagram that shows a cross-sectional view of two half-cells, one of which is a photoanode and the other of which is a photocathode.

FIG. 3 is a diagram that shows a cross-sectional view of two half-cells of photoelectrodes, one of which is a photoanode 301 and the other of which is a photocathode 303. The photoanode 301 comprises n-type silicon 304 with an iron oxide catalyst layer 305. In response to light 315 with a wavelength greater than $\lambda_G$ (as defined below), the photoanode 301 generates photocarriers. The iron oxide catalyst layer 305 increases the reaction rate of a water-splitting (oxygen evolution) reaction 307 in electrolyte solution that is adjacent to the catalyst. The photocathode 303 comprises a p-type semiconductor 309 and a hydrogen evolution catalyst 311. Catalyst 311 increases the reaction rate of a hydrogen evolution reaction 313 in electrolyte solution that is adjacent to catalyst 311. In response to light 314 with a wavelength less than $\lambda_G$, the photocathode 303 generates photocarriers. As used in this description of FIG. 3, the term "$\lambda_G$" means the wavelength of light at which the photon energy of light is equal to the bandgap energy of the p-type semiconductor 309 in the photocathode 303.

Figure 4:
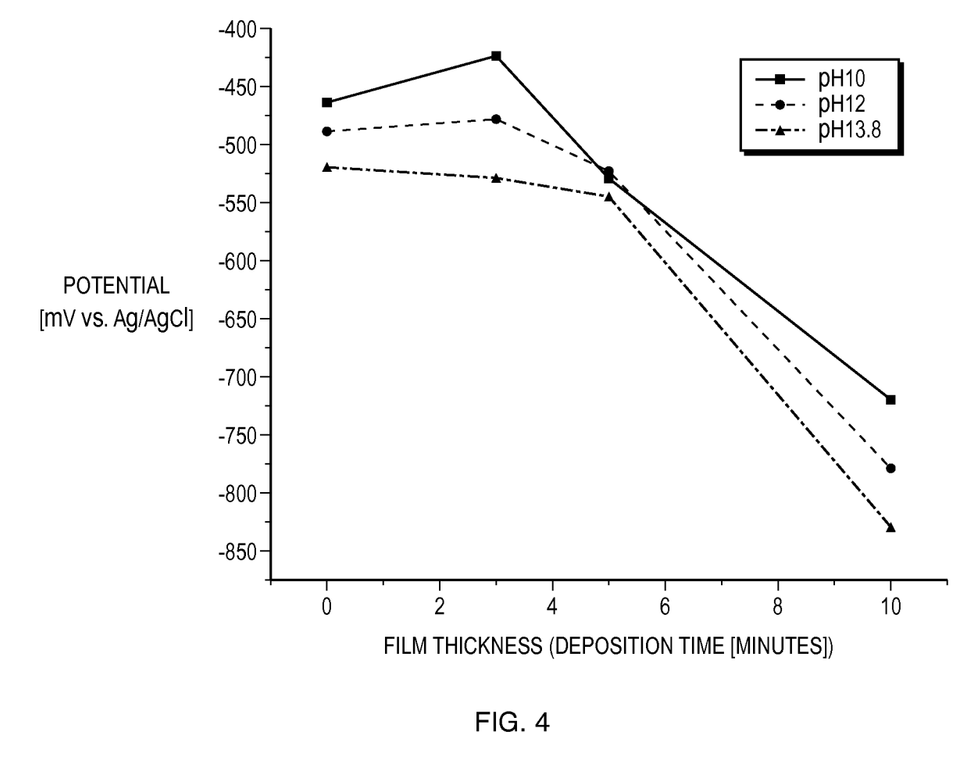
FIG. 4 is a chart showing flat band potential vs. catalyst film thickness (the thickness being expressed as a function of duration of chemical vapor deposition of the film).

FIG. 4 is a chart showing measured flat band potential vs. catalyst film thickness (the thickness being expressed as a function of duration of chemical vapor deposition of the film).

For the flat band potential measurements that are plotted in FIG. 4, photoanodes were made of n+ back doped silicon substrates to minimize the effect of Schottky space charge region. Iron-oxide catalyst films were prepared for various thickness of 0, 6, 10 and 20 nm,(corresponding to 0, 3, 5 and 10 minutes deposition) and three different pH electrolytes (10, 12 and 13.8) were also prepared. Fluctuation voltage was set to 5 mV rms. Potential scan started from 0.5 V vs. Ag/AgCl to cathodic direction. (End points vary on samples, typically −0.8~−0.9 V vs. Ag/AgCl). Operation frequency was 20 and 50 kHz, which gave almost identical values. All measurements were conducted after 5 minutes open circuit delay under dark environment. For analysis, a model with series connection of a resistor and a capacitor was adopted.

As shown in FIG. 4, when the iron-oxide catalyst layer is thin (<10 nm), flat band potential remains similar to bare silicon value, around −0.5 V vs. Ag/AgCl. 20 nm films show rapid shifts of flat band potential. From this observation, it appears that the electronic characteristics of the photoelectrodes are governed by the silicon characteristic when the iron-oxide film, which follows Nernst relation, is thin. (In the above discussion, "Ag/AgCl" means voltage measured at an Ag/AgCl reference electrode.)

Figure 5:
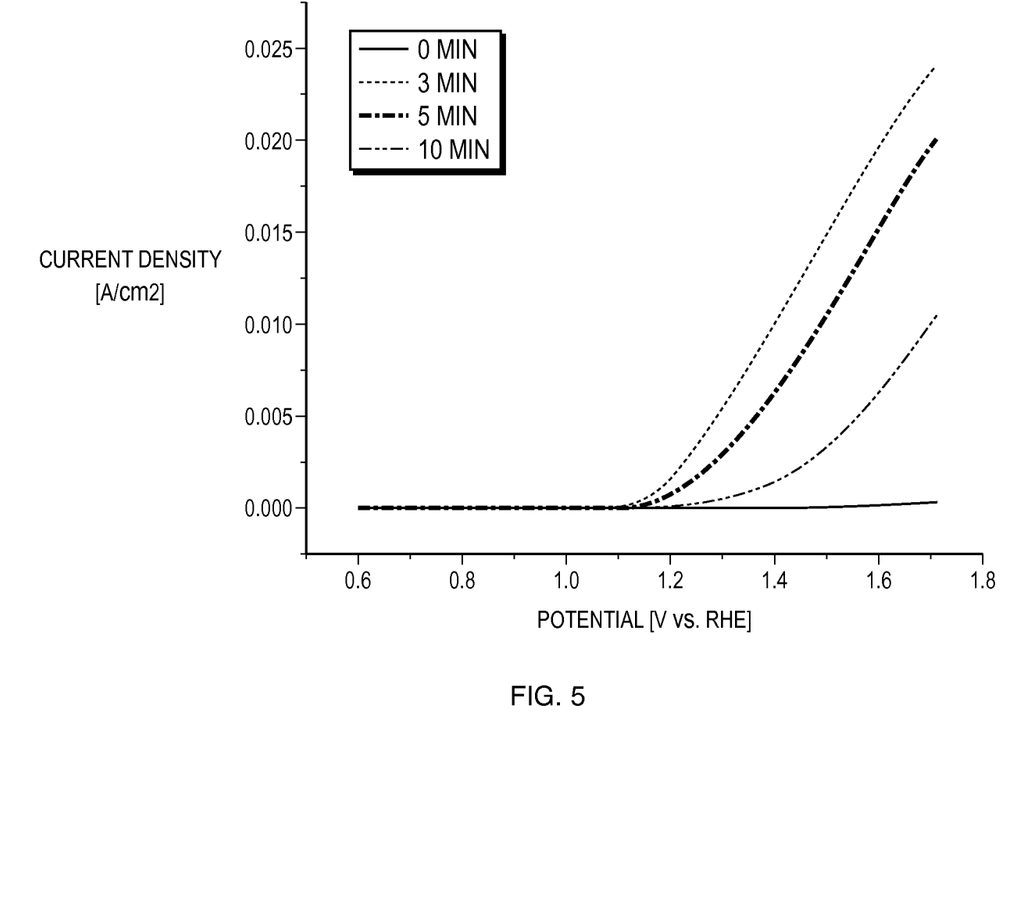
FIG. 5 is a chart showing current density at different thicknesses of catalyst film.

FIG. 5 is a chart showing measured current density at different thicknesses of catalyst film, in a prototype of this invention. The thickness is expressed as a function of duration of chemical vapor deposition of the film.

Figure 6A:
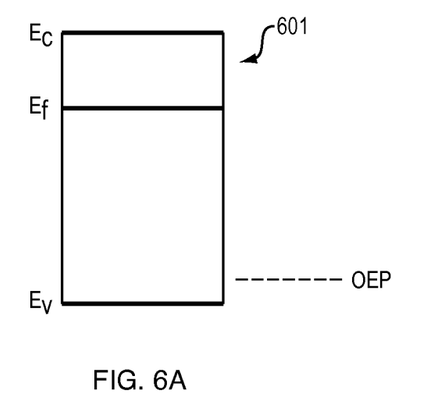
FIGS. 6A and 6B are diagrams showing approximate energy band models relating to a photoanode/electrolyte junction.
Figure 6B:
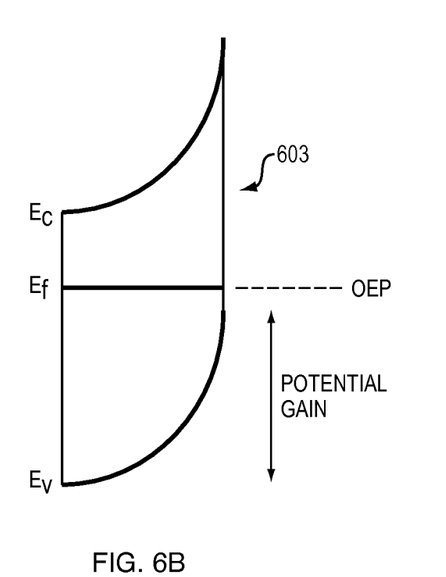

FIGS. 6A and 6B are diagrams showing approximate energy band models relating to a photoanode/electrolyte junction, in a prototype of this invention.

The photoanode includes (a) a light-absorbing semiconductor that comprises n-type silicon and (b) an ultrathin iron oxide catalyst layer. More particularly, FIG. 6A shows approximate energy band levels for the junction immediately after the photoanode is immersed in the electrolyte. FIG. 6B shows approximate energy band levels for the junction after the photoanode has been immersed in the electrolyte sufficiently long for the junction to be in thermal equilibrium. When the electrode-electrolyte junction is in thermal equilibrium, the Fermi level of silicon and the OEP (oxygen evolution potential) become closely aligned, as shown in FIG. 6B.

OEP locates higher (more cathodic) than the silicon valence band edge. Therefore, energetically, oxygen evolution reaction may happen in silicon and electrolyte junction. In the absence of a proper catalytic layer, the lack of catalytic functionality of silicon prohibits the procession of the reaction. However, if a proper catalyst like iron-oxide is introduced, the charge carriers can pass through the junction.

For purposes of the energy band models shown in FIGS. 6A and 6B, the space charge region of the iron oxide/electrolyte junction can be calculated using Poisson's equation. The Fermi level of the iron-oxide can be estimated from known flat band potential. (−0.6 V vs. standard calomel electrode (SCE)). Then, the surface barrier (difference between iron-oxide Fermi level and OEP) is about 0.7 V. If iron-oxide carrier concentration is assumed to be about $10^{16}$ cm$^{-3}$ with a dielectric constant about 60, then the space charge region thickness of the iron-oxide/electrolyte junction may be calculated to be about 680 nm. In fact, in the prototype, the iron-oxide has much lower carrier concentration, which means even thicker space charge region. If the iron oxide is sufficiently thin (e.g., less than 10 nm), then the space charge region is much thicker than iron-oxide physical thickness. Therefore, the potential drop by iron-oxide is negligible, and most of the space charge region may occur in the silicon semiconductor instead. This induces steep upward bending in silicon energy band structure, providing potential gain as indicated in FIG. 6B.

In FIGS. 6A and 6B, only the semiconductor 601, 603 is shown, not the catalyst layer or the electrolyte solution.

The following is a description of some prototypes of this invention: Thin iron-oxide film was deposited on silicon substrate by low temperature atmospheric pressure CVD to catalyze oxygen evolution reaction. When iron-oxide film was sufficiently thin, around 10 nm or less, otherwise nonresponsive silicon photoanode showed a high photocurrent. Parametric studies revealed that the photoresponses become effective when (1) iron-oxide film is thin, (2) titanium content is high and (3) operation pH is high. The photocarriers are generated by silicon while the role of iron-oxide is limited to catalyst. The catalytic functionality of standalone iron-oxide is fairly good, but not exceptionally outstanding. However, the performance is greatly boosted when combined with semiconducting silicon substrate. The reason is believed that iron-oxide can catalyze silicon surface without disturbing favorable upward band bending nature of silicon at the electrolyte junction.

Silicon microfabrication techniques were used to fabricate these prototypes, including ohmic contact formation on the silicon backside and vertical wires array fabrication. By these measures, the onset potentials were decreased and the current-potential slope became steeper, resulting in high current density as high as 17 mA/cm$^2$ at zero overpotential. Extended time operation revealed oxygen evolution.

Conventionally, silicon photoanodes have not been successful due to the lack of catalysis and the energy band mismatch. In these prototypes of this invention, however, silicon is successfully used for a photoanode with the help of appropriate catalyst and pH control.

Some prototypes of this invention achieved high photocurrent at anode reaction at zero overpotential. Although the open circuit voltage is low due to narrow band gap of silicon, the current density of 17 mA/cm$^2$ is at least 5 to 10 times larger than conventional photoanodes using metal oxide semiconductors with 2~3 eV band gap. 4.

An energy band model helps explain the high performance of prototypes of this invention. Silicon has ideal band edge alignment in certain operational conditions (high pH electrolyte, ultrathin iron oxide catalyst layer, n-type silicon) since oxygen evolution potential is closely aligned with valence band edge. Also, a semiconducting catalyst (iron-oxide) plays an effective catalytic function.

The following is an analysis of why a photoanode prototype of this invention generates a high photocurrent. In this prototype, n-type silicon is the primary light absorber. An ultrathin iron oxide ($\alpha$ Fe$_2$O$_3$) catalyst film interposed between the silicon and a high pH electrolyte solution increases the rate of the water-splitting reaction.

The analysis is as follows:

In addition to good catalytic functionality of thin iron-oxide films, favorable energy band alignment of silicon attributes to the high photocurrent. Silicon is generally considered an unsuitable anode for water splitting due to its high valence band edge position. However, while most metal oxide semiconductors follow Nernst relation (i.e., flat band potential shifts −0.059 mV/pH), the silicon band potential is known to be less sensitive to pH. Therefore, at high pH, the difference between the silicon valence band edge and oxygen evolution potential (OEP) becomes small since the OEP also shifts −0.059 mV/pH. Measured flat band potential of bare silicon is about −0.5 V vs. Ag/AgCl. Considering the doping level of the silicon wafers (resistivity 5~25 Ω-cm) and operational pH (12~14), the valence band edge of silicon locates below OEP, which satisfies the energetic requirement for hole transfer. Nevertheless, spontaneous water oxidation cannot occur in bare silicon due to the lack of catalytic assistance. Here, iron-oxide appears to catalyze the oxidation reaction at the junction between the liquid and the silicon/iron oxide photoanode).

Although $\alpha$-Fe$_2$O$_3$ is a semiconductor, the ~10 nm thickness of the iron oxide layers is thinner than the typical nondegenerate semiconductor space-charge region. Since there is no metallic barrier between electrolyte and silicon, most of the space-charge region likely appears within the silicon. Thus, thermal equilibrium induces strong upward bending of silicon energy band because the silicon flat band potential is negative (cathodic) with respect to OEP. This built-in potential, along with a good catalytic performance of iron-oxide, appears to be a reason for high photocurrent in the silicon/iron oxide photoanode.

The flat band potential of bare silicon and silicon coated with a very thin (less than 10 nm) iron-oxide film remain at a similar level. This suggests that, in the case of this silicon/iron oxide device, the electronic band structure is governed by silicon.

In contrast, in a thick-film scenario (where the thickness of the iron-oxide film is greater than 20 nm), the flat band potential is shifted significantly from that of bare silicon. Thus, in this thick-film scenario: (a) iron-oxide becomes no longer negligible in electronic characteristics; (b) equivalent bulk resistance increases due to short carrier diffusion length and low conductivity of iron-oxide, (c) iron-oxide now contributes to the potential drop, and (d) the built-in potential in the silicon decreases, which hampers the photoresponse.

This is a motivation for using ultra-thin catalyst layers in this invention.

The following description provides more details regarding the photoanode prototype of this invention that is illustrated in FIG. 2. This prototype generates a photocurrent, and generates oxygen and hydrogen. The materials and process choices for this prototype are not exclusive.

Substrate preparation: n-type silicon ((100) direction, 10~20 ohm-cm) is thoroughly cleaned by organic solvent and HF solution.

Back doping for ohmic contact: The backside of the silicon is doped to form shallow n$^+$ layer to make ohmic contact with metal electrode. In the embodiment, spin-on doping was used. Spin-on dopant was coated on the backside of the silicon, and annealed in the tube furnace. Afterward, HF solution was used to etch away the spin-on dopant.

Iron-oxide thin film: Through atmospheric pressure chemical vapor deposition (CVD), iron-oxide thin film was deposited on the front side of the silicon. The silicon was placed on heating surface, and volatile gas vapor, iron pentacarbonyl (iron-oxide precursor) and titanium isopropoxide (titanium dopant), was fed around this silicon surface. The film thickness is very thin. In this prototype, it is less than 10 nm.

Metal contact: After CVD, metal contact was made on the silicon backside where n$^+$ doping was made. In the embodiment, aluminum layer was deposited first followed by silver deposition. (Silver prevents oxidation during air exposure. Under well controlled fabrication environment, silver can be omitted.) Then, a copper wire was attached to this metal contact.

Sealing: The device except iron-oxide top surface was encapsulated by epoxy sealing. FIG. 2 shows layers of material in this prototype.

Operation: The device was dipped in electrolyte solution with iron-oxide/silicon facing illuminated light. The wire is connected to a potentiostat and cathode. Oxygen is evolved in this anode and hydrogen is evolved in cathode. The electrolyte consists of sodium hydroxide and disodium hydrogen phosphate. Solution pH typically ranges 12~14.

In this photoanode prototype, silicon is used as a light absorption layer and iron-oxide is used as a catalyst. Iron-oxide film thickness is controlled by film deposition time whose deposition rate was 2 nm/minute.

Flat band potentials of 0-5 minutes (0-10 nm thickness) films remain almost unchanged. When the film gets thicker such as 10 minutes (20 nm), the flat band potential changes abruptly. This means that, until the film thickness becomes around 10 nm, the hybrid photoelectrode band structure is almost identical to that of bare silicon. However, when it gets thicker, the band structure experiences an abrupt change (as shown in FIG. 4). This region corresponds to iron-oxide hole diffusion length. (<20 nm). This trend is reflected in photocurrent measurement data (for different thicknesses of iron oxide films, with thickness expressed as a function of time duration of deposition). 0 minute (bare silicon) shows no photoresponse. This is because silicon has no catalytic functionality although it is a good photovoltaic semiconductor. Catalysis is improved when a thin layer of iron-oxide, e.g., thinner than 10 nm is deposited in 3 minutes (6 nm) and 5 minutes (10 nm) profiles. In the thin film case, carriers generated in the light absorption layer are directly transferred to electrolyte with the help of catalyst (not drawn).
Definitions and Clarifications:

Here are a few definitions and clarifications. As used herein:

The terms "a" and "an", when modifying a noun, do not imply that only one of the noun exists.

The fact that an "example" or multiple examples of something are given does not imply that they are the only instances of that thing. An example (or a group of examples) is merely a non-exhaustive and non-limiting illustration.

The term "include" shall be construed broadly, as if followed by "without limitation".

"OEP" means oxygen evolution potential.

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

"RHE" means reverse hydrogen electrode.

Two values are "substantially" equal if they differ by less than 10%.

Two values differ "substantially" if they differ by 10% or more.

Two values differ by a certain percent, if $$[(x-y)/x] \times 100$$

equals that certain percent, where x is the larger of the two values and y is the smaller of the two values.
Variations This invention may be implemented in many ways, including in addition to those described above. Here are some non-limiting examples:

The material used in the light-absorbing semiconductor is not limited to single crystal silicon. A silicon photoanode produces high photocurrent due to the large built-in potential in semiconductor to liquid junction (under the conditions described with respect to FIG. 6B). This comes from the close alignment of the semiconductor valence band and oxygen evolution potential. Therefore, other semiconductors with valence band near 1.23 V vs. RHE would be appropriate (e.g. with a valence band equal to 1.23-1.25 V vs. RHE). For example, amorphous silicon (a-Si) and cuprous oxide ($Cu_2O$) may be used for the light-absorbing semiconductor.

This invention is not limited to high pH electrolyte solutions. It may be employed with either basic or acidic electrolyte solutions.

This invention is not limited to any particular method of depositing the catalyst layer. For example, any method of vacuum deposition may be employed, such as physical vapor deposition (PVD) or chemical vapor deposition (CVD) (including low pressure chemical vapor deposition, and plasma enhanced CVD). The particles being deposited may come, for example, from sputtering.

This invention is not limited to using vertical wire arrays (if a wire array is used at all). For example, particle decoration or array configurations may be used to enhance light harvesting capability. Or, for example, wire length adjustment or light incidence angle modification may be used for better silicon efficiency.

Alternatively, a roughened surface (e.g., with random bumps) may be used, instead of a wire array.

In some implementations, it is desirable to reduce silicon etching that would otherwise occur over time in a basic environment and to thereby extend the silicon lifetime. Various approaches may be used to achieve this goal.

For example, etch-resistive crystal surface like Si (111) may be used, which may extend the life time by about 2~3 orders of magnitude (as compared to Si (100) substrate. Alternately, an active protection layer for the silicon surface may be used. For example, surface alkylation may increase stability of the silicon surface. Or, for example, surface treatment like methylation or hydrophobic coating of the bottom area could elongate the lifetime.

The iron-oxide film may experience a gradual detachment from the host surface. This detachment may be mitigated by decreasing current density per iron oxide film area. To compensate for the decreased current density, the surface area can be increased by a corrugated film surface, such as a dendrite structure.[51]

In some implementations, it is desirable to strengthen the catalyst film. For example, the film may be strengthened by using sintering, annealing or adding atomic components.

In some implementations, complete removal of native oxide on silicon is performed, to prevent weak adhesion between silicon and iron oxide film. Alternately, adhesion is increased by promoting interlayer between silicon and iron-oxide.

In a prototype of this invention, a photoanode works on half cell reaction. Since the band gap of silicon is 1.12 eV, which is smaller than water redox potential difference (1.23 V), potential compensation is needed for cathode reaction. This can be achieved with the architecture shown in FIG. 3. A photocell or photocathode is stacked with this silicon/iron oxide photoanode and the energy bands of this entire cell straddle the water redox potential. In this architecture, the cathode electrode preferably has band alignment for hydrogen evolution. This stacked photodevice can be located either upstream or downstream of the silicon/iron oxide photoanode. Because the silicon/iron oxide photoanode uses a narrow band gap material (silicon), it is preferable to install the wide band gap cathode stack upstream of the silicon/iron oxide photoanode.

This invention may be implemented as a photoelectrode that includes a semiconductor for photocarrier generation and a catalyst layer for altering the rate of an electrochemical reaction in an electrolyte adjacent to the catalyst layer, wherein: (a) the semiconductor primarily comprises a first material and the catalyst layer primarily comprises a second material, the first material being different than the second material, (b) the catalyst layer covers a portion of the semiconductor's surface, (c) the thickness of the catalyst layer is less than 60% of the minority carrier diffusion distance of the catalyst layer, (d) the photoelectrode is either a photoanode or a photocathode, (e) if the photoelectrode is a photoanode, the photoanode is adapted to have an OEP that is more than the potential of the valance band edge of the semiconductor and less than the potential of the Fermi level of the semiconductor, the absolute value of the difference between the OEP and the potential of the valence band edge being greater than zero and less than or equal to 0.2V, and (f) if the photoelectrode is a photocathode, the photocathode is adapted to have an RHE potential that is less than the potential of the conduction band edge of the semiconductor and more than the potential of the Fermi level of the semiconductor, the absolute value of the difference between the RHE potential and the potential of the conduction band edge being greater than zero and less than or equal to 0.2V. Furthermore: (1) the semiconductor may primarily comprise silicon and the catalyst layer may primarily comprise iron oxide; (2) the catalyst layer may comprise iron oxide and the thickness of the catalyst layer may be less than 12 nm; (3) at least a portion of the semiconductor may comprise an array of nanowires or nanotubes that is covered at least in part by the catalyst layer; (4) the photoelectrode may be a photoanode, the interior of the semiconductor may be doped with a first n-type dopant at a first dopant concentration, and an exterior region of the semiconductor that is not covered by the catalyst layer may be doped with a second n-type dopant at a second dopant concentration, the second dopant concentration being greater than the first dopant concentration; (5) the first n-type dopant and second n-type dopant may both comprise phosphorous; (6) the photoelectrode may be a photocathode, the interior of the semiconductor may be doped with a first p-type dopant at a first dopant concentration, and an exterior region of the semiconductor that is not covered by the catalyst layer may be doped with a second p-type dopant at a second dopant concentration, the second dopant concentration being greater than the first dopant concentration; (7) the first p-type dopant and second p-type dopant may both comprise boron; (8) the catalyst layer may primarily comprise nickel oxide, nickel borate, cobalt oxide, or another compound that includes cobalt or nickel; and (9) the semiconductor may primarily comprise amorphous silicon or cuprous oxide.

This invention may be implemented as a photoelectrochemical cell, wherein: (a) the photoectrochemical cell includes a photoelectrode, (b) the photoelectrode includes a semiconductor for photocarrier generation and an catalyst layer for altering the rate of an electrochemical reaction in an electrolyte adjacent to the catalyst layer, (c) the semiconductor primarily comprises a first material and the catalyst layer primarily comprises a second material, the first material being different than the second material, (d) the catalyst layer covers a portion of the semiconductor's surface, (e) the thickness of the catalyst layer is less than 60% of the minority carrier diffusion distance of the catalyst layer, (f) the photoelectrode is either a photoanode or a photocathode, (g) if the photoelectrode is a photoanode, the photoanode is adapted to have an OEP that is more than the potential of the valance band edge of the semiconductor and less than the potential of the Fermi level of the semiconductor, the absolute value of the difference between the OEP and the potential of the valence band edge being greater than zero and less than or equal to 0.2V, and (h) if the photoelectrode is a photocathode, the photocathode is adapted to have an RHE potential that is less than the potential of the conduction band edge of the semiconductor and more than the potential of the Fermi level of the semiconductor, the absolute value of the difference between the RHE potential and the potential of the conduction band edge being greater than zero and less than or equal to 0.2V. Furthermore: (1) the semiconductor may primarily comprise silicon, the catalyst layer may primarily comprise iron oxide, and the thickness of the catalyst layer may be less than 12 nm; (2) at least a portion of the semiconductor may comprise an array of nanowires or nanotubes covered at least in part by the catalyst layer; (3) the photoelectrode may be a photoanode, the interior of the semiconductor may be doped with an n-type dopant, and an exterior region of the semiconductor that is not covered by the catalyst layer may be doped with an n+ dopant; and (4) the photoelectrode may be a photocathode, the interior of the semiconductor may be doped with a p-type dopant, and an exterior region of the semiconductor that is not covered by the catalyst layer may be doped with a p+ dopant.

This invention may be implemented as a method of using a photoelectrochemical cell to generate electricity, which method comprises, in combination: (a) using a semiconductor in a photoelectrode to generate photocarriers, and (b) using a catalyst layer in the photoelectrode to alter the rate of an electrochemical reaction in an electrolyte adjacent to the photoelectrode, wherein: (i) the photoelectrode is a component of the photoelectrochemical cell, (ii) the semiconductor primarily comprises a first material and the catalyst layer primarily comprises a second material, the first material being different than the second material, (iii) the catalyst layer covers a portion of the semiconductor's surface and is positioned between the semiconductor and the electrolyte, (iv) the thickness of the catalyst layer is less than 60% of the minority carrier diffusion distance of the catalyst layer, (v) the photoelectrode is either a photoanode or a photocathode, (vi) if the photoelectrode is a photoanode, the photoanode has an OEP that is more than the potential of the valance band edge of the semiconductor and less than the potential of the Fermi level of the semiconductor, the absolute value of the difference between the OEP and the potential of the valence band edge being greater than zero and less than or equal to 0.2V, and (vii) if the photoelectrode is a photocathode, the photocathode has an RHE potential that is less than the potential of the conduction band edge of the semiconductor and more than the potential of the Fermi level of the semiconductor, the absolute value of the difference between the RHE potential and the potential of the conduction band edge being greater than zero and less than or equal to 0.2V. Furthermore: (1) the semiconductor may comprise silicon and the catalyst layer may comprise iron oxide; (2) the catalyst layer may comprise iron oxide and the thickness of the layer may be less than 12 nm; (3) at least a portion of the semiconductor may comprise an array of nanowires or nanotubes covered at least in part by the catalyst layer; and (4) either (A) the photoelectrode may be a photoanode, the interior of the semiconductor may be doped with an n-type dopant, and an exterior region of the semiconductor that is not covered by the catalyst layer may be doped with an n+ dopant, or (B) the photoelectrode may be a photocathode, the interior of the semiconductor may be doped with a p-type dopant, and an exterior region of the semiconductor that is not covered by the catalyst layer may be doped with a p+ dopant.

Conclusion

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:
1. A photoanode that includes:
(a) a semiconductor for photocarrier generation; and
(b) a catalyst layer for altering the rate of an electrochemical reaction in an electrolyte adjacent to the catalyst layer;
wherein
(i) the semiconductor primarily comprises a first material and the catalyst layer primarily comprises a second material, the first material being different than the second material,
(ii) the catalyst layer covers a portion of the semiconductor's surface,

(iii) the thickness of the catalyst layer is less than 60% of the minority carrier diffusion distance of the catalyst layer, (iv) the photoanode is adapted to have an OEP that is more than the potential of the valance band edge of the semiconductor and less than the potential of the Fermi level of the semiconductor, the absolute value of the difference between the OEP and the potential of the valence band edge being greater than zero and less than or equal to 0.2V, and (v) the interior of the semiconductor is doped with a first n-type dopant at a first dopant concentration, and an exterior region of the semiconductor that is not covered by the catalyst layer is doped with a second n-type dopant at a second dopant concentration, the second dopant concentration being greater than the first dopant concentration.

2. The photoanode of claim 1, wherein the first n-type dopant and second n-type dopant both comprise phosphorous.

3. A photoelectrochemical cell, wherein:

(a) the photoectrochemical cell includes a photoanode;

(b) the photoanode includes a semiconductor for photocarrier generation and a catalyst layer for altering the rate of an electrochemical reaction in an electrolyte adjacent to the catalyst layer;

(c) the semiconductor primarily comprises a first material and the catalyst layer primarily comprises a second material, the first material being different than the second material;

(d) the catalyst layer covers a portion of the semiconductor's surface;

(e) the thickness of the catalyst layer is less than 60% of the minority carrier diffusion distance of the catalyst layer;

(f) the photoanode is adapted to have an OEP that is more than the potential of the valance band edge of the semiconductor and less than the potential of the Fermi level of the semiconductor, the absolute value of the difference between the OEP and the potential of the valence band edge being greater than zero and less than or equal to 0.2V; and (g) the interior of the semiconductor is doped with an n-type dopant, and an exterior region of the semiconductor that is not covered by the catalyst layer is doped with an n+dopant.

* * * * *